United States Patent [19]

Lefrancois

[11] 4,374,111
[45] Feb. 15, 1983

[54] PRODUCTION OF SILANE

[75] Inventor: Philip A. Lefrancois, Cranford, N.J.

[73] Assignee: Allied Corporation, Morris Township, Morris County, N.J.

[21] Appl. No.: 208,978

[22] Filed: Nov. 21, 1980

[51] Int. Cl.$^3$ ............................................. C01B 33/04
[52] U.S. Cl. ................................. 423/347; 423/490; 423/499
[58] Field of Search .................... 423/347, 490, 499; 556/474

[56] References Cited

U.S. PATENT DOCUMENTS

| | | | |
|---|---|---|---|
| 3,043,664 | 7/1962 | Mason et al. | 23/204 |
| 3,050,366 | 8/1962 | Ringwald | 423/347 |
| 3,419,354 | 12/1968 | Berger | 423/347 |
| 3,607,896 | 9/1971 | Michael | 556/474 |
| 3,926,833 | 12/1975 | Hoffman et al. | 423/347 X |

FOREIGN PATENT DOCUMENTS 909950 11/1962 United Kingdom .

OTHER PUBLICATIONS

William M. Mueller et al., Metal Hydrides (Academic Press 1968), pp. 585–588.
A. E. Finholt et al., 69 J. Am. Chem. Soc., 2692–2696, (1947).
C. H. Lewis et al., J. of the Electrochemical Soc., vol. 108, No. 12, pp. 1114–1118, (1961).
Padma et al., J. Fluorine Chem., vol. 14, pp. 327–329, (1979).
R. dePape, Ann. Chim, vol. 8, pp. 185–188, (1963).
P. Hagenmuller, Compt Rend Acad Sci., pp. 2032–2034, (1960).

*Primary Examiner*—Jack Cooper
*Attorney, Agent, or Firm*—Alan M. Doernberg; Gerhard H. Fuchs

[57] ABSTRACT

A silicon halide such as silicon tetrafluoride is reacted with an agitated slurry of an alkali metal hydride such as sodium hydride in a liquid which includes a diaryl ether such as diphenyl ether. At elevated temperatures such as 250°–260° C., complete conversion of the silicon tetrahalide to silane is observed, even with contact times under two seconds.

13 Claims, 1 Drawing Figure

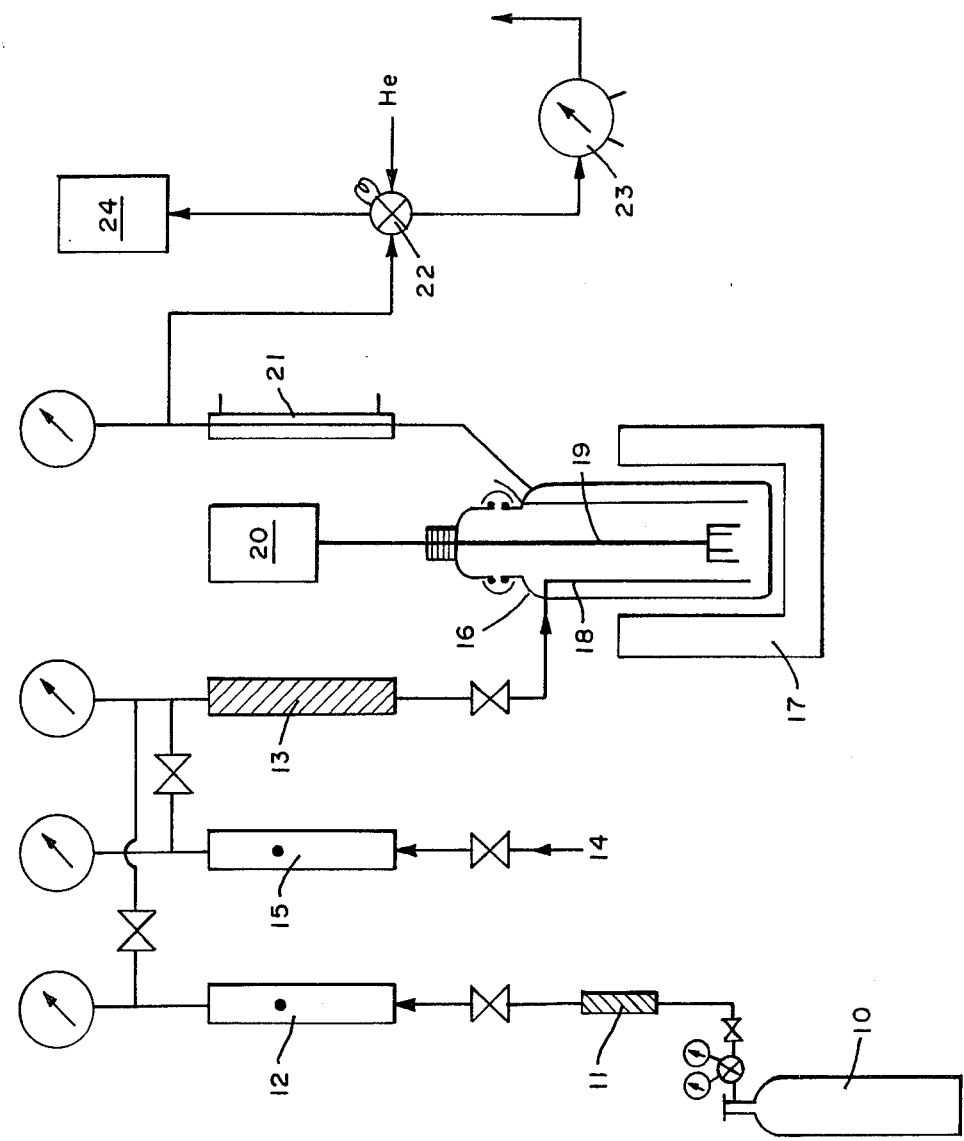

PRODUCTION OF SILANE

BACKGROUND OF THE INVENTION

The present invention relates to the production of silane from halogenated silanes, and especially to the reaction of an alkali metal hydride with a silicon halide to form silane and an alkali metal halide.

The reaction of an alkali metal hydride with a silicon halide to form silane and alkali metal halide is described in British Pat. No. 909,950, published Nov. 7, 1962. The reference indicates that the reaction proceeds in the presence of certain zinc-containing salts and in the presence of certain ethers which have appreciable solvent action for the halogen-substituted silane compound. The reference gives examples of reactions of silicon tetrachloride and various other chlorosilanes and bromosilanes, but not fluorosilanes. Examples given of suitable ethers are tetrahydrofuran, diethyleneglycol dimethyl ether, ethyleneglycol dimethyl ether, 1,4-dioxane, diethyl ether, dipropyl ether, diisopropyl ether, triethyleneglycol dimethyl ether, tetraethyleneglycol dimethyl ether and dichlorodiethyl ether.

There are also limited disclosures in the art of the conversion of silicon tetrafluoride to silane using either calcium hydride or lithium aluminum hydride. Only the lithium aluminum hydride reaction is reported to result in complete conversions. Calcium hydride, and especially lithium aluminum hydride, are much more expensive materials than sodium hydride. For many uses of silane it is desirable that the product silane be essentially free of halogenated silanes including unreacted silicon tetrafluoride.

BRIEF DESCRIPTION OF THE INVENTION

The present invention includes a process which comprises reacting a silicon halide with an agitated slurry of an alkali metal hydride in a liquid comprising a diaryl ether under conditions forming silane and the corresponding alkali metal halide.

DETAILED DESCRIPTION OF THE INVENTION

In the process of the present invention, silicon tetrafluoride is the preferred silicon halide, although silicon tetrachloride, silicon tetrabromide and silicon tetraiodide may also be used. Silicon tetrafluoride is available as a by-product of phosphoric acid manufacture, and it represents a disposal problem for the operator of the phosphoric acid plant. It is contemplated that partially halogenated silanes such as difluorosilane or trichlorosilane may replace part of the silicon tetrahalide. It is also contemplated to use partially halogenated silanes, and especially partially chlorinated silanes such as trichlorosilane, dichlorosilane, mixtures of these with each other or mixtures of these with other chlorosilanes (including halogenated polysilanes) as the feed material, even if no silicon tetrahalide is present. Thus any silicon halide containing silicon, at least one halogen and, optionally, hydrogen may be used, with the preferred silicon halides being silicon tetrafluoride, silicon tetrachloride and trichlorosilane. The alkali metal hydride used in the present invention is preferably sodium hydride, but may also be lithium hydride or potassium hydride. Sodium hydride is preferred because of its lower cost.

The liquid used to slurry the alkali metal hydride should contain a diaryl ether such as diphenyl ether. The ether may be blended with other materials, and especially with high boiling hydrocarbons such as biphenyl. The ether itself may contain monocyclic or polycyclic radicals bonded to the oxygen, each of which may be unsubstituted or substituted by a variety of groups which are inert under the reaction condition. The substituents may themselves contain ether linkages, such as methoxy, ethoxy and the like. The preferred ether is diphenyl ether, and the preferred diluents (if any are present) are aromatic hydrocarbons and especially biphenyl. It is preferred that the liquid be at least 50% diaryl ether by weight, with a representative liquid being about 50-95% diphenyl ether and about 5-50% biphenyl, by weight. Other suitable diaryl ethers include dinaphthyl ether, dibenzyl ether, 1,4-diphenoxybenzene and phenyl naphthyl ether. It is thus intended to include ethers wherein one or both of the aryl groups are indirectly linked to the oxygen as in dibenzyl ether or where there are more than one ether oxygen as in 1,4-diphenoxybenzene. The ether and diluent, if any, should have a boiling point at or above the intended reaction temperature. The proportion of alkali metal hydride in the liquid is not critical, but may be determined in a manner conducive to vigorous agitation both of the initial slurry and of the slurry once a proportion of the alkali metal hydride has been converted to alkali metal halide. Thus, for example, when sodium hydride is reacted with silicon tetrafluoride, the formation of by-product sodium fluoride inhibits agitation unless sufficient liquid is present. Furthermore, the alkali metal hydride should be maintained in as small particles as is possible in order to permit complete reaction.

The precise temperature of the reaction is not critical; however, especially where silicon tetrafluoride is used, it is preferred to employ elevated temperatures near the boiling point of the liquid. With diphenyl ether, it is preferred to operate between about 225° C. and the approximately 258° C. boiling point of diphenyl ether (at atmospheric pressure). Higher temperatures may also be used by permitting superatmospheric pressures. Thus an overall preferred range of about 225°-300° C. is contemplated. It is more preferred to use temperatures between about 240° and about 260° C., and most preferred to use temperatures between about 250° and about 260° C. While increased reaction to form silane occurs at elevated temperatures, there is also an increase in the decomposition of the alkali metal hydride to form hydrogen and free alkali metal. As seen, for example, in example 18 below, this decomposition begins to occur at about 255° C.

It is possible to introduce the silicon halide with a diluent. Suitable diluents include nitrogen and noble gases. Hydrogen is also a suitable diluent and, in certain circumstances, may be preferred in that hydrogen vapor may tend to inhibit the decomposition of alkali metal hydride.

Vigorous agitation of the slurry is required in practicing the process of the present invention. Various techniques known to the art may be used, including stirrers of various configurations including cruciform stirrers, disc stirrers, blenders, turbines, propellers and counter-rotating stirrers. Other means of maintaining high agitation may also be employed. The present examples, and especially examples 17 and 18, illustrate the differences in results achieved with a high degree of agitation and a somewhat lower degree of agitation.

Agitation sufficient to break up the solid particles into small particles, such as ten micrometers or smaller, is desirable. This is normally achieved with stirrers having a high shear rate, which can be measured by the peripheral velocity of the stirrer. Of course, with reaction mixtures having significant height, some means for vertical mixing is also required. The cruciform stirrer used in the Examples gives good vertical mixing and a peripheral velocity of about 600 feet per minute (about 185 m/min) at the 3000 rev/min speed of Example 17. It is preferable to employ agitations having shear rates at least this great. Criteria other than peripheral velocity, such as power consumption per unit volume, may also be employed in characterizing the degree of agitation. Other means, such as attriting agents, may be used to supplement the agitation.

It is necessary when conducting the process of the present invention to use rigorously anhydrous conditions to avoid hydrolysis of either the alkali metal hydride or the silane product. If some moisture is contained in a continuous system, however, it will generally be removed by the initial reaction and, thereafter, sufficiently anhydrous conditions will be present.

The silane produced by the present invention may be used directly as a chemical intermediate or otherwise, or may be decomposed directly at elevated temperatures (e.g. 800° C.) to form silicon of high purity. Alternatively, the silane may be purified by a variety of conventional techniques before being used or decomposed.

The slurry produced in the reaction may be separated by conventional techniques such as evaporation and extraction into solvent, unreacted alkali metal hydride (if any) and by-product alkali metal halide. The solvent may be recycled. As indicated in Examples 1, 6 and 7, side reactions such as the formation of fluorosilicates, do not generally occur until after the alkali metal hydride is consumed. It is thus preferable to stop the reaction before the hydride is totally consumed or to continuously introduce fresh hydride, preferably while continuously removing alkali metal halide.

The following examples are intended to illustrate, but not to limit, the present invention compared to the broader scope set forth in the claims that follow. Several comparative examples are interspersed among the examples of the present invention to illustrate the superior conversions achieved with the use of diaryl ethers compared to aliphatic ethers and tetrahydrofuran.

EXAMPLES

The following examples were conducted in the laboratory apparatus shown in the FIGURE. A tank 10 of silicon tetrafluoride (reagent grade) is connected through a molecular sieve drier 11 and a flow meter 12 to a gas mixer 13. In most examples a diluent source 14 (nitrogen or hydrogen) is connected through a flow meter 15 to the gas mixer 13. A glass reactor 16 of generally cylindrical shape is surrounded by an electric heating mantle 17 and is fitted with an inlet tube 18 terminating near the bottom of the reaction zone. The bottom end of inlet tube 18 was fitted with a glass frit to disperse gas bubbles in Examples 1-7, but the frit was thereafter removed when it was determined not to be required. The mixture from mixer 13 was fed to inlet tube 18. A cruciform stirrer 19 (three quarter inch or 19 mm diameter) was located in the reaction zone and driven by a motor 20 through a bearing and special 24/40 joint constructed of stainless steel with two neoprene O-rings and containing PTFE-glass gaskets. The bearing and joint were water-cooled. The motor speed was monitored periodically and adjusted to the desired speed (10,000, 5,000 or 3,000 rev/min) by adjusting a voltage regulator. The reactor 16 was connected through an air cooled condenser 21 to a manual sampling valve 22 and then to a kerosene wet test meter 23 for a determination of gas volume. The effluent from the wet test meter was vented to the atmosphere and was observed to self-ignite in many runs. The valve 22 was connected to a Varian gas chromotograph (Model 3700) 24 with a 7.0 meter length, 3.2 mm outside diameter Porapak PS column so as to entrain a 0.5 mL gas sample in a helium carrier gas into the column. In some early runs, the chromotograph was programmed to go from 30° C. to 50° C. and hold; but in later runs, the column was operated at a constant 50° C. temperature. In this latter operating mode major peaks were detected by thermal conductivity at 1.9–2.1 min (nitrogen), 2.2–2.4 min (silicon tetrafluoride) and at 3.4–3.8 min (silane). The balance of the area percent up to 100% was contained in small peaks including one eluting immediately before nitrogen (possibly hydrogen which was poorly differentiated from helium by the thermal detector) and another eluting between silicon tetrafluoride and silane (possibly another fluorosilane). In a few of the Examles, a small peak was also observed eluting after silane that could be $Si_2H_6$.

In each run, data was taken periodically including: stirrer speed, pressures and flow rates through meters 12 and 15, pressure after condenser 21, temperature in the reaction vessel 16 by an ironconstantan thermocouple connected to a recorder, cumulative volume at wet test meter 23, curves and integrations for peaks at least 0.01 area % and time. The temperatures given are accurate to within two degrees. In Example 22 the voltage and amperage at motor 20 was also monitored. Only some of this data is reported in the following text.

In Examples 1–14 the reactor vessel 16 had an inner diameter of 63 mm and a 300 mL capacity. In Examples 15–23 a larger reactor with inner diameter of 63 mm and 750 mL inside volume was used. It is estimated that gas contact times were on the order of one quarter second in the small reactor and one second in the larger reactor.

EXAMPLE 1

The system shown in the Figure and described above was used with the smaller reactor. The reactor was charged with a ten gram solid slurry of sodium hydride in mineral oil (containing 6 g or 0.25 mol NaH) slurried in 100 mL of a 73.5% diphenyl ether/26.5% biphenyl mixture (by weight) (sold by Dow Chemical Company under their "DOWTHERM A" registered trademark). Agitation was started at about 10,000 rev/min and a nitrogen flow of 50 mL/min was started into the reactor through the glass frit below the liquid level. Thereafter 50 mL/min of silicon tetrafluoride and 50 mL/min of nitrogen were together fed through the glass frit. The initial temperature was raised from 50° C. at the start of the run to about 200° C. over 30 minutes and then gradually increased to about 255° C. Temperatures (in °C.) and analysis of the effluent (in area percent) beginning at 199° C. are shown in Table 1.

TABLE 1

| Time (min) | Temp (°C.) | $N_2$ | $SiF_4$ | $SiH_4$ |
|---|---|---|---|---|
| 27 | 199 | 44.44 | 55.28 | 0.18 |
| 38 | 215 | 43.16 | 55.40 | 1.44 |
| 50 | 223 | 43.62 | 55.46 | 0.92 |

TABLE 1-continued

| Time (min) | Temp (°C.) | $N_2$ | $SiF_4$ | $SiH_4$ |
|---|---|---|---|---|
| 61 | 235 | 45.66 | 52.70 | 1.51 |
| 73 | 244 | 56.46 | 36.08 | 7.01 |
| 85 | 252 | 60.59 | 6.69 | 32.11 |
| 96 | 255 | 40.71 | 2.34 | 56.69 |
| 106 | 254 | 68.67 | 8.04 | 22.91 |
| 117 | 255 | 79.19 | 8.56 | 11.99 |
| 130 | 255 | 80.24 | 13.59 | 6.03 |
| 143 | 255 | 84.74 | 8.59 | 5.80 |
| 157 | 254 | 70.22 | 17.53 | 9.83 |
| 170 | 257 | 56.82 | 41.37 | 1.81 |
| 185 | 257 | 50.74 | 48.99 | 0.27 |
| 198 | 257 | 48.71 | 51.14 | 0.14 |
| 212 | 255 | 46.23 | 53.77 | 0.00 |

From Table 1, it can be seen that complete conversion to silane was approached once 250° C. was exceeded. Inlet pressure build up was observed beginning at about 87 minutes and the effluent, when released into the atmosphere, began to flame at 104 minutes and continued until 198 minutes.

After removal of the solvent from the slurry, the solids were analyzed by x-ray diffraction. Sodium fluoride and sodium fluosilicate ($Na_2SiF_6$) were observed in about equal amounts, but not sodium hydride. In other runs of this type wherein the reaction was stopped before complete sodium hydride consumption (as evidenced by reaction when contacted with water), sodium fluoride was detected, but not sodium fluosilicate. This indicates that silicon tetrafluoride reacts with sodium hydride so long as it is present, and only reacts with sodium fluoride to form the fluosilicate after the sodium hydride is substantially exhausted.

COMPARATIVE EXAMPLES 2 and 3

Example 1 was repeated twice using 100 mL of two different mineral oils in place of the diphenyl ether/biphenyl mixture. The first was a high boiling, primarily aliphatic mineral oil sold by Exxon under their trademark Bayol 72. NaH in mineral oil (total 15 g or 0.37 mol NaH) was used for his run. The second mineral oil was a high boiling paraffinic oil, sold by Sun Oil under their trademark Sunpar 2280. NaH (0.25 mol) as a 10 g slurry was used in the oil. In the first run, the maximum conversion (based on area percent of effluents) was 1.3 percent at 250° C., with temperatures up to 300° C. being tried. In the second run, the maximum conversion (based on area percent of effluents) was 3 percent at 294° C., with temperatures up to 307° C. tried.

COMPARATIVE EXAMPLE 4

When Example 1 was repeated using 100 mL of tetrahydrofuran (boiling point 65° C., this temperature was not exceeded during the run) maximum conversion to silane was 0.5% at 58° C.

COMPARATIVE EXAMPLE 5

When Example 1 was repeated using 100 mL of bis(2-ethoxyethyl)ether as solvent with 0.37 mol NaH, and 1 g of 18-crown-6 ether to improve solubility, the best conversion was about 4 percent. Table 2 presents representative run data for this experiment. The numbers indicate area percent values.

TABLE 2

| Time (min) | Temp (°C.) | $N_2$ | $SiF_4$ | $SiH_4$ |
|---|---|---|---|---|
| 30 | 49 | 8.14 | 88.00 | 3.85 |
| 48 | 76 | 7.04 | 90.17 | 2.79 |
| 58 | 112 | 7.08 | 90.55 | 2.39 |
| 69 | 128 | 6.82 | 91.92 | 1.25 |
| 81 | 150 | 6.45 | 92.09 | 1.46 |
| 93 | 175 | 6.53 | 90.76 | 2.71 |
| 102 | 130 | 6.95 | 91.68 | 1.37 |
| 112 | 76 | 6.67 | 92.5 | 0.83 |
| 121 | 52 | 6.74 | 92.43 | 0.83 |

Similar runs with the same 300 mL reactor and the bis (2-ethoxy-ethyl)ether without 18-crown-6 produced silane yields in the 3-12 percent range between about 150° and 180° C., with most runs being between 150° and 160° C. because some ether was observed in the effluent as the 190° boiling point of the ether was approached.

EXAMPLE 6

Example 1 was repeated using 0.25 mol NaH in mineral oil slurried in 100 mL diphenyl ether/biphenyl. The stirrer speed was lowered to 3,000 rev/min and the flow was about 50 mL/min silicon tetrafluoride (going down to 33.2 mL/min at 73 min) and 50 mL/min nitrogen (going down to 46 mL/min at 73 min). The results are displayed in Table 3.

TABLE 3

| Time (min) | Temp (°C.) | $N_2$ | $SiF_4$ | $SiH_4$ |
|---|---|---|---|---|
| 13 | 103 | 43.91 | 55.95 | 0.14 |
| 25 | 206 | 43.18 | 56.60 | 0.24 |
| 37 | 242 | 43.30 | 56.22 | 0.48 |
| 51 | 257 | 47.11 | 50.03 | 2.67 |
| 62 | 259 | 48.55 | 37.67 | 13.52 |
| 73 | 259 | 40.80 | 30.04 | 29.00 |
| 85 | 259 | 41.53 | 17.19 | 41.09 |
| 98 | 258 | 46.01 | 17.11 | 36.54 |
| 109 | 259 | 45.09 | 28.21 | 26.61 |
| 120 | 260 | 50.34 | 47.83 | 1.60 |
| 132 | 260 | 50.26 | 48.98 | 0.56 |
| 143 | 261 | 47.80 | 51.51 | 0.52 |

The failure to approach 0 percent $SiF_4$ indicates that the agitation rate was marginal. After the solvent was removed from the residual slurry, x-ray analysis showed sodium fluoride with a minor amount of sodium fluosilicate.

EXAMPLE 7

Example 1 was repeated using 10,000 rev/min stirring speed and using 0.50 mol NaH (a 20 g slurry including mineral oil) in 100 mL diphenyl ether/biphenyl. The results are displayed in Table 4.

TABLE 4

| Time | Temp | $N_2$ | $SiF_4$ | $SiH_4$ |
|---|---|---|---|---|
| 13 | 154 | 49.92 | 50.08 | — |
| 26 | 243 | 52.44 | 44.00 | — |
| 35 | 245 | 55.87 | 33.36 | 10.78 |
| 41 | 254 | 54.43 | 6.29 | 39.27 |
| 47 | 258 | 33.99 | 2.34 | 63.68 |
| 53 | 258 | 50.04 | 0 | 49.96 |
| 60 | 257 | 53.36 | 0 | 46.64 |
| 66 | 254 | 53.39 | 0 | 46.61 |
| 72 | 254 | 52.67 | 0 | 47.33 |
| 78 | 252 | 49.61 | 0 | 50.39 |
| 85 | 252 | 45.37 | 0 | 54.63 |
| 92 | 250 | 47.23 | 0 | 52.77 |

At about 92 minutes, the outlet plugged up with the slurry and the reaction was stopped. Then the slurry was removed in a dry box, filtered and washed with hexane to recover the original solvent and produce a dry solid apparently unreactive with water, which, on x-ray analysis, appeared to be NaF free of $Na_2SiF_6$.

EXAMPLE 8

Using the apparatus of Example 1, 0.25 mol NaH (as a 10 g slurry in mineral oil) mixed with 100 mL pure diphenyl ether was charged to the nitrogen-flushed reactor. Nitrogen (50 mL/min) and $SiCl_4$ (added in one mL increments through a burette releasing liquid between gas mixer 13 and inlet tube 18, and swept into the reactor with nitrogen) were added and the effluents were analysed. The results in area percentages are indicated in Table 5.

TABLE 5

| Time | Temp | Cumulative $SiCl_4$ Added (mL) | $N_2$ | $SiCl_4$ | $SiH_4$ |
|---|---|---|---|---|---|
| 1 | 35 | 1.00 | — | — | — |
| 7 | 46 | — | 97.94 | 1.13 | — |
| 24 | 101 | — | 87.82 | 11.43 | — |
| 38 | 127 | — | 53.55 | 17.61 | — |
| 47 | 133 | 2.00 | — | — | — |
| 55 | 141 | — | 63.84 | 2.81 | — |
| 83 | 175 | — | 99.24 | 0.63 | — |
| 94 | — | 3.05 | — | — | — |
| 100 | 220 | — | 93.01 | 0.79 | 0.96 |
| 116 | 255 | — | 95.67 | 1.19 | 2.32 |
| 131 | 255 | 4.05 | 95.67 | 1.19 | 2.32 |
| 140 | 252 | 5.05 | — | — | — |
| 145 | 252 | — | 97.40 | 0.92 | 0.99 |
| 159 | 261 | 7.05 | — | — | — |
| 161 | 252 | — | 97.60 | 1.32 | 1.08 |
| 178 | 250 | — | 98.95 | 0.39 | 0.66 |
| 190 | 260 | — | 90.61 | — | 6.24 |
| 219 | 261 | 9.10 | — | — | — |
| 223 | 259 | — | 44.69 | 4.60 | 20.35 |
| 239 | 258 | — | 41.27 | 8.30 | 0.49 |
| 252 | exit lit up | — | — | — | — |
| 256 | — | 10.10 | — | — | — |
| 258 | 261 | — | 29.55 | 10.55 | 26.20 |
| 276 | 259 | — | 67.08 | 0 | 0.43 |

COMPARATIVE EXAMPLE 9

When Example 8 was repeated using bis(2-ethoxyethyl)ether as solvent, little $SiH_4$ was observed over the 160°-182° C. range as indicated in Table 6.

TABLE 6

| Time | Temp | Cumulative $SiCl_4$ Added (mL) | $N_2$ | $SiCl_4$ | $SiH_4$ |
|---|---|---|---|---|---|
| 6 | 35 | 1.00 | — | — | — |
| 10 | 40 | — | 99.43 | — | — |
| 24 | 44 | — | 96.55 | 2.86 | 0.51 |
| 36 | 65 | — | 97.60 | 2.07 | 0.33 |
| 47 | 92 | 2.00 | 98.87 | 0.91 | 0.22 |
| 63 | 132 | — | 98.38 | 0.76 | 0.08 |
| 74 | 160 | 3.00 | 97.83 | 0.80 | 0.08 |
| 88 | 180 | 4.00 | 98.76 | 0.35 | 0.08 |
| 101 | 182 | — | 99.03 | 0.43 | 0 |
| 113 | 182 | 5.00 | 99.31 | 0.32 | 0 |

While conversions are difficult to determine from Tables 5 and 6, it should be apparent that significantly higher yields of silane resulted in Example 8 where diphenyl ether was the solvent than in Comparative Example 9 where bis(2-ethoxyethyl)ether was the solvent.

EXAMPLE 10

The procedure of Example 1 was followed, except that a 7,000 rev/min stirrer speed was used and the slurry charged was 0.25 mol NaH (as a 10 g slurry in mineral oil), 70 mL of mineral oil (Exxon's Bayol 72) and 30 mL of the diphenyl ether/biphenyl blend. Yields of silane were very low throughout the reaction, with the temperature varied from 150° C. to 280° C. This Example indicates the undesirability of using a liquid which contains only about 25% diaryl ether.

EXAMPLE 11

The procedure of Example 1 was followed with the temperature gradually raised from 203° C. (at 68 minutes) to 257° C. (at 171 minutes). Gas chromotography readings and calculated conversions (based on standard values for mol percent vs. area percent) are displayed in Table 7.

TABLE 7

| Time | Temp | $N_2$ | $SiF_4$ | $SiH_4$ | % Conversion |
|---|---|---|---|---|---|
| 68 | 203 | 32.45 | 67.42 | 0.12 | — |
| 116 | 225 | 34.32 | 65.18 | 0.05 | — |
| 132 | 242 | 42.47 | 52.86 | 4.40 | 7.7 |
| 151 | 249 | 49.76 | 33.45 | 16.79 | 33.4 |
| 171 | 257 | 43.98 | 20.60 | 35.42 | 63.2 |

One higher value (72 percent) was calculated at 246 min when the temperature was 256° C.

EXAMPLES 12 and 13

For comparison with Example 11, two runs were made using mixtures of diphenyl ether with mineral oil (Exxon's Bayol 72) first 50/50 by volume, then 75/25 by volume. 10 g of NaH slurry (0.25 mol) were used in each case. Representative data is reported below in conversions on an output basis, using extrapolated values for 240°, 245°, 250°, 255°, 260° and 263° C.

| Temperature | Ex 11 | Ex 12 | Ex 13 |
|---|---|---|---|
| 240 | 6.0 | 0.8 | 0.7 |
| 245 | 13.2 | 1.6 | 1.1 |
| 250 | 40.7 | 3.1 | 4.0 |
| 255 | 67.6 | 9.0 | 10.0 |
| 260 | — | 30.8 | 25.3 |
| 263 | — | 81.7 | 74.0 |

These results indicate that high yields could be obtained with diphenyl ether mixed either with mineral oil or with biphenyl, but that better results in the 250°-260° C. range are obtained with biphenyl as a diluent.

COMPARATIVE EXAMPLE 14

The procedure of Example 1 was followed with an initial charge of 0.25 mol NaH as a 10 g slurry in mineral oil and 100 mL of dimethyl ether of tetraethylene glycol. Some gas evolved on mixing these materials (presumably hydrogen from reaction of NaH with free hydroxyls or moisture). The results are displayed in Table 8.

TABLE 8

| Time | Temp | $N_2$ | $SiF_4$ | $SiH_4$ | Conversion |
|---|---|---|---|---|---|
| 9 | 39 | 39.59 | 54.25 | 5.40 | 9.1 |
| 22 | 42 | 38.18 | 55.32 | 5.63 | 9.2 |
| 38 | 78 | 36.97 | 56.98 | 5.21 | 8.4 |
| 51 | 114 | 35.46 | 61.06 | 2.61 | 4.1 |
| 65 | 203 | 37.55 | 56.22 | 5.23 | 8.5 |
| 74 | 225 | 37.05 | 58.01 | 3.82 | 6.2 |
| 91 | 248 | 37.58 | 60.59 | 1.06 | 1.7 |
| 103 | 257 | 37.76 | 60.42 | 0.25 | 0.4 |
| 116 | 266 | 35.08 | 60.12 | 0.05 | 0.08 |

TABLE 8-continued

| Time | Temp | $N_2$ | $SiF_4$ | $SiH_4$ | Conversion |
|---|---|---|---|---|---|
| 128 | 269 | 35.15 | 63.00 | — | — |

These results show some reaction at low temperatures, but no improvement as the temperature was raised. In general, no conversion over about 10% occurred.

EXAMPLE 15

An enlarged cylindrical reactor was used for this and the following examples having an inner diameter of 63 mm and an inside volume of 750 mL. The charge was 1 mol NaH (as a 40 g slurry in mineral oil) and 400 mL of the diphenyl ether/biphenyl mixture. Introduction of 50 mL/min of nitrogen and 50 mL/min of $SiF_4$ into the slurry near the base of the reaction mixture resulted in a fourfold increased contact time compared to that in the reactor used in the prior reactions. The stirrer speed for the cruciform stirrer was approximately 10,000 rev/min. The results of gas chromotography analysis (by area percent) of the effluent are displayed in Table 9.

It is interesting to note that complete conversion of the silicon tetrafluoride occurred using the longer contact time reactor, but did not occur in earlier examples with the shorter contact time reactor, except for Example 7 where the sodium hydride concentration was increased. This suggests that conversion can be increased by a variety of techniques including increased contact time.

TABLE 9

| Time | Temp | $N_2$ | $SiF_4$ | $SiH_4$ |
|---|---|---|---|---|
| 13 | 54 | 34.35 | 65.50 | — |
| 25 | 67.8 | 34.92 | 65.08 | — |
| 38 | 102 | 32.12 | 67.37 | .09 |
| 52 | 162 | 34.10 | 65.68 | .11 |
| 68 | 210 | 33.00 | 66.54 | .25 |
| 83 | 239 | 35.05 | 63.16 | 1.19 |
| 92 | 251 | 37.66 | 56.98 | 4.15 |
| 101 | 258 | 53.85 | 26.61 | 16.89 |
| 111 | 258 | 48.66 | 5.60 | 43.41 |
| 120 | 258 | 31.10 | 0 | 67.14 |
| 130 | 258 | 40.58 | 0 | 61.89 |
| 140 | 258 | 40.58 | 0 | 57.66 |
| 150 | 257.5 | 40.04 | 0 | 59.18 |
| 160 | 258 | 39.13 | 0 | 60.82 |
| 170 | 257 | 38.37 | 0 | 61.40 |
| 180 | 257 | 36.01 | 0 | 63.02 |
| 190 | 257.5 | 48.24 | 0 | 51.71 |

EXAMPLE 16

The larger reactor of Example 15 was charged with 1.0 mol NaH as a 40 g slurry in mineral oil and 400 mL of the diphenyl ether/biphenyl mixture. The stirrer speed was set at 5,000 rev/min (and varied between 4,900 and 5,150 rev/min during the run). The results are displayed in Table 10.

TABLE 10

| Time | Temp | Area Percentages | | |
|---|---|---|---|---|
| | | $N_2$ | $SiF_4$ | $SiH_4$ |
| 33 | 107 | 35.49 | 64.31 | — |
| 43 | 151 | 36.30 | 63.59 | — |
| 57 | 199 | 34.64 | 65.20 | 0.16 |
| 69 | 230 | 34.94 | 63.95 | 0.71 |
| 78 | 250 | 37.35 | 59.34 | 2.28 |
| 86 | 257 | 45.89 | 43.96 | 9.13 |
| 100 | 258 | 42.72 | 15.28 | 42.00 |
| 107 | 257 | 31.02 | 2.52 | 66.35 |
| 114 | 257 | 32.54 | 0 | 67.41 |
| 124 | 257 | 44.35 | 0 | 55.38 |
| 134 | 257 | 44.50 | 0 | 55.25 |
| 144 | 257 | 43.87 | 0 | 56.13 |
| 154 | 257 | 42.16 | 0 | 57.84 |
| 164 | 258 | 40.06 | 0 | 59.94 |
| 174 | 258 | 39.92 | 0 | 60.08 |
| 184 | 258.5 | 60.37 | 0 | 39.63 |

The area percentages in Table 10 were converted to mol percentages in Table 11 using calibrations developed with known mixtures of pure nitrogen, silicon tetrafluoride and silane. Total volume of effluent was determined periodically and compared to the volumes flowing in. They matched fairly well throughout the run, except for a volume increase between about 100 and about 150 minutes, when hydrogen was apparently being generated from NaH. The accuracy of the total calculations are indicated by the nitrogen and silicon tetrafluoride mass balances shown at the end of Table 11. Conversions of NaH to silane and hydrogen were calculated as indicated.

TABLE 11

| Temp. (°C.) | Time min. | Volume Balance Out (%) In | Product Gas mol % | | | | Conversion |
|---|---|---|---|---|---|---|---|
| | | | $H_2$* | $N_2$ | $SiF_4$ | $SiH_4$ | |
| 33 | 107 | 101 | — | 45 | 55 | 0 | 0 |
| 43 | 151 | 100 | — | 46 | 54 | 0 | 0 |
| 57 | 199 | 100 | — | 44 | 55 | 0.2 | 0 |
| 69 | 230 | 97 | — | 45 | 54 | 0.7 | 1 |
| 78 | 250 | 101 | — | 47 | 50 | 2.3 | 11 |
| 86 | 257 | 108 | — | 46 | 44 | 9 | 70 |
| 100 | 258 | 107 | — | 43 | 15 | 42 | 94 |
| 107 | 257 | 126 | — | 34 | 3 | 64 | 100 |
| 114 | 257 | 152 | 34 | 23 | 0 | 42 | 100 |
| 124 | 257 | 130 | 23 | 37 | 0 | 40 | 100 |
| 134 | 257 | 130 | 23 | 37 | 0 | 40 | 100 |
| 144 | 257 | 129 | 23 | 36 | 0 | 41 | 100 |
| 154 | 257 | 119 | 17 | 38 | 0 | 45 | 100 |
| 164 | 258 | 108 | — | 43 | 0 | 57 | 100 |
| 174 | 258 | 97 | — | 43 | 0 | 57 | 100 |
| 184 | 258.5 | 69 | — | 63 | 0 | 37 | 100 |

*based on volume in minus volume out from 107 to 154 minutes
% $N_2$ Balance = 97
% $SiF_4$ Balance = 103
% NaH to $H_2$ = 13
% NaH to $SiH_4$ = 92

Calculated total effluent volumes were 8.4 L nitrogen, 1.56 L hydrogen, 4.6 L silicon tetrafluoride and 5.6 L silane over the entire 184 minutes.

EXAMPLE 17

Example 16 was repeated with the stirrer speed lowered to about 3,000 rev/min. A reaction rate was achieved at 257° C. where the silane peak was approximately the same size as the silicon tetrafluoride peak, but complete conversion as in Example 16 was not achieved.

EXAMPLE 18

Example 16 was repeated using 1.5 mol NaH as a 60 g solid slurry and 400 mL diphenyl ether-biphenyl, with most of the run between 253° and 256° C. The area percentages were converted to mol percent using calibrations developed with pure nitrogen, silicon tetrafluoride and silane. Complete conversion to silane was observed from 114 to 214 minutes at temperatures in the 253°–256° C. range. Total volume of effluent was determined periodically and compared to the volumes flowing in. They matched well except for a volume increase between about 100 to about 190 minutes when hydrogen was apparently being generated from NaH and after 200 minutes when SiF$_4$ was apparently being absorbed in NaF to form Na$_2$SiF. A mass balance was calculated, with 104% of the nitrogen accounted for and 95% of the silicon tetrafluoride accounted for. Silane analysis indicated 81% of the NaH went to silane and the estimated hydrogen seen as gas volume increase indicated 21% of the NaH was converted to hydrogen.

COMPARATIVE EXAMPLE 19

Using the large reactor of Example 15, 1 mol NaH in a 40 g slurry in mineral oil was charged with 400 mL dimethyl ether of tetraethylene glycol. With the stirring rate at about 5,000 rev/min, nitrogen and silicon tetrafluoride were admitted at about 50 mL/min each. The results are displayed in Table 12.

TABLE 12

| Time | Temp | N$_2$ | SiF$_4$ | SiH$_4$ |
|---|---|---|---|---|
| 35 | 31 | 93.98 | 4.88 | 0.08 |
| 42 | 42 | 89.68 | 2.63 | 7.09 |
| 50 | 54 | 71.08 | 20.96 | 6.66 |
| 60 | 58 | 51.43 | 41.54 | 5.23 |
| 72 | 60 | 46.46 | 45.58 | 6.48 |
| 81 | 60 | 43.64 | 48.08 | 6.75 |
| 91 | 61 | 42.10 | 49.74 | 6.46 |
| 101 | 72 | 39.39 | 53.12 | 6.00 |
| 113 | 102 | 37.11 | 56.96 | 4.57 |
| 123 | 138 | 38.08 | 55.70 | 4.99 |
| 134 | 177 | 43.97 | 44.64 | 9.75 |
| 142 | 202 | 47.58 | 37.48 | 12.58 |
| 151 | 226 | 53.48 | 27.70 | 13.95 |
| 161 | 251 | 59.77 | 24.43 | 7.81 |
| 170 | 265 | 59.88 | 30.73 | 1.14 |

This experiment showed about 12% conversion at 40° to 60° C., but less than 30% conversion at any temperature, even with the longer contact times of the larger apparatus.

EXAMPLE 20

Example 16 was repeated using 0.5 mol NaH in a 20 g mineral oil slurry and 400 mL of the diphenyl ether/biphenyl mixture. While conversions up to 83% occurred, the complete conversions produced in Examples 16 and 18 did not appear.

EXAMPLE 21

Example 16 was repeated using 50 mL/min of hydrogen and 50 mL/min of silicon tetrafluoride as the feed gases. At about 254° C. the silicon tetrafluoride peak disappeared and six samples were taken over 47 minutes with all of the silicon tetrafluoride apparently converted to silane. The presence of hydrogen gas did not, however, appear to appreciably retard sodium hydride decomposition.

EXAMPLE 22

Example 16 was repeated using the large reactor purged with nitrogen, and then a silicon tetrafluoride flow of about 60 mL/min and no diluent flow. The results are displayed in Table 13.

TABLE 13

| Time | Temp | N$_2$ | SiF$_4$ | SiH$_4$ |
|---|---|---|---|---|
| 0 | 22 | 3.27 | 96.73 | — |
| 7 | 24 | 4.30 | 95.59 | — |
| 17 | 73 | 3.02 | 96.71 | — |
| 26 | 118 | 2.59 | 97.14 | — |
| 36 | 162 | 2.35 | 97.53 | — |
| 46 | 198 | 1.98 | 97.76 | 0.13 |
| 56 | 227 | 0.99 | 97.83 | 0.65 |
| 66 | 250 | 0.77 | 93.84 | 3.53 |
| 75 | 256 | 0.99 | 81.29 | 15.80 |
| 85 | 256 | 0.77 | 51.57 | 46.75 |
| 95 | 256 | 0.26 | 11.87 | 87.44 |
| 105 | 256 | 0.13 | 0.49 | 98.91 |
| 115 | 256 | 0.65 | 0.08 | 98.97 |
| 125 | 256 | 0.63 | — | 99.14 |
| 135 | 256 | 0.58 | — | 99.18 |
| 145 | 256 | 0.32 | — | 99.33 |
| 155 | 256 | 0.28 | — | 99.16 |

The column labeled "N$_2$" appears to indicate depletion of residual nitrogen during the first hour as the temperature was raised. The rise in the value after 105 minutes may be due to hydrogen formation from NaH decomposition. These results indicate that complete conversion of silicon tetrafluoride can occur without any diluent. Based upon the voltage and amperage at motor 20, a power consumption of 50 watts was computed, corresponding to about 125 watts per liter.

EXAMPLE 23

When Example 22 was repeated with a 90 mL/min SiF$_4$ flow and no diluent, complete conversion was approached, but not achieved. The gas chromotography result closest to complete conversion was, by area percentage: 0.19% N$_2$, 6.70% SiF$_4$, 92.84% SiH$_4$ and the balance two minor peaks.

What is claimed is:

1. A process which comprises reacting a silicon halide with an agitated slurry of an alkali metal hydride in a liquid comprising at least about 50% by weight of a diaryl ether at a temperature between about 225° C. and the boiling point of the diaryl ether at the reaction pressure to effect formation of silane and the corresponding alkali metal halide.

2. The process of claim 1 wherein the alkali metal hydride is sodium hydride.

3. The process of claim 1 wherein the silicon halide is silicon tetrafluoride.

4. The process of claim 1 wherein the silicon halide is silicon tetrachloride.

5. The process of claim 1 wherein the silicon halide is trichlorosilane.

6. The process of claim 1 wherein the diaryl ether is diphenyl ether.

7. The process of claim 1 wherein the alkali metal hydride is sodium hydride, the silicon halide is silicon tetrafluoride and the diaryl ether is diphenyl ether.

8. The process of claim 1 or 3 or 7 wherein the reaction temperature is between about 240° C. and about 260° C.

9. The process of claim 1 or 3 or 7 wherein the reaction temperature is between about 250° C. and about 260° C.

10. The process of claim 1 wherein the silicon halide is fed as a mixture with a diluent into the agitated slurry.

11. The process of claim 10 wherein the diluent is nitrogen.

12. The process of claim 10 wherein the diluent is hydrogen.

13. The process of claim 6 or 7 wherein the liquid is between about 50% and about 95% diphenyl ether and between about 5% and about 50% biphenyl.

* * * * *